(12) United States Patent
Chakravarthy

(10) Patent No.: US 9,400,588 B2
(45) Date of Patent: Jul. 26, 2016

(54) SUPPORTING DISPLAY OF CONTEXT MENUS IN BOTH CASCADED AND OVERLAPPING STYLES

(75) Inventor: Amogh Chakravarthy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1241 days.

(21) Appl. No.: 13/343,001

(22) Filed: Jan. 4, 2012

(65) Prior Publication Data

US 2013/0174041 A1    Jul. 4, 2013

(51) Int. Cl.
*G06F 3/00* (2006.01)
*G06F 3/0482* (2013.01)

(52) U.S. Cl.
CPC .................................. *G06F 3/0482* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,757,371 A * | 5/1998 | Oran | ...................... | G06F 3/0482 715/779 |
| 6,476,833 B1 * | 11/2002 | Moshfeghi | ........ | G06F 17/30867 707/E17.109 |
| 7,246,329 B1 * | 7/2007 | Miura | ................... | G06F 3/0482 715/764 |
| 7,533,352 B2 | 5/2009 | Chew et al. | | |
| 2002/0140738 A1 * | 10/2002 | West | ..................... | G06F 9/4443 715/810 |
| 2003/0187912 A1 * | 10/2003 | Kenyon | ................ | G06F 9/4443 709/200 |
| 2004/0021647 A1 * | 2/2004 | Iwema | .................. | G06F 3/0488 345/179 |
| 2004/0061720 A1 * | 4/2004 | Weber | ............... | G06F 17/30899 715/760 |
| 2005/0039141 A1 * | 2/2005 | Burke | ............... | G06F 17/30899 715/810 |
| 2005/0108406 A1 * | 5/2005 | Lee | ................... | G06F 17/30867 709/228 |
| 2006/0036966 A1 * | 2/2006 | Yevdayev | ......... | G06F 17/30873 715/779 |
| 2006/0073814 A1 | 4/2006 | Allen et al. | | |
| 2006/0184894 A1 * | 8/2006 | Daniels | ................. | G06F 3/0482 715/783 |
| 2006/0242557 A1 * | 10/2006 | Nortis, III | ............. | G06F 3/0482 715/234 |
| 2007/0130125 A1 * | 6/2007 | Holte | ................ | G06F 17/30873 |
| 2007/0162898 A1 | 7/2007 | Ramani et al. | | |
| 2008/0184158 A1 * | 7/2008 | Selig | ..................... | G06F 17/243 715/781 |

(Continued)

FOREIGN PATENT DOCUMENTS

WO    WO 2004025420 A2 *  3/2004   ........ G06F 17/30899

OTHER PUBLICATIONS

Customizing Context Menus in Office 2010, http://msdn.microsoft.com/en-us/library/ee691832.aspx , Copyright 2011 Microsoft, p. 1-8.

(Continued)

*Primary Examiner* — Hien Duong
(74) *Attorney, Agent, or Firm* — IPHorizons PLLC; Narendra Reddy Thappeta

(57) ABSTRACT

A computing system provided according to an aspect of the present invention contains a server system operable to send a same hierarchical menu to client systems which display the sub-menus of the hierarchical menu in a overlapping style or a cascading style. As a result, the implementation of server systems supporting such client systems may be simplified. According to another aspect, an event handler is also implemented on the server system, to process the events generated by client system displaying menus in both the overlapping style and the cascading style. According to yet another aspect, a server system stores a in-memory representation of a context menu, and thereafter serves requests from different clients for the same hierarchical menu based on such in-memory representation.

14 Claims, 13 Drawing Sheets

(56) References Cited

U.S. PATENT DOCUMENTS

| | | | |
|---|---|---|---|
| 2008/0189360 A1* | 8/2008 | Kiley | G06F 17/30867 709/203 |
| 2008/0301581 A1 | 12/2008 | Baek et al. | |
| 2009/0125953 A1* | 5/2009 | Porter | H04N 21/23103 725/109 |
| 2010/0064255 A1* | 3/2010 | Rottler | G06F 3/0488 715/821 |
| 2010/0088343 A1 | 4/2010 | Goldberg et al. | |
| 2010/0179876 A1* | 7/2010 | Holte | G06F 17/3089 705/14.54 |
| 2010/0205547 A1* | 8/2010 | Boegelund | G06F 3/0482 715/760 |
| 2010/0332325 A1* | 12/2010 | Holte | G06Q 30/0256 705/14.54 |
| 2011/0055768 A1* | 3/2011 | Chen | G06F 3/0482 715/841 |
| 2011/0060995 A1 | 3/2011 | Whalen et al. | |
| 2011/0173299 A1* | 7/2011 | Lightstone | G06F 17/30893 709/219 |
| 2012/0066647 A1* | 3/2012 | Ullmann | G06F 3/0481 715/841 |
| 2012/0226979 A1* | 9/2012 | Harberts | G06F 3/0482 715/702 |
| 2012/0227011 A1* | 9/2012 | McCoy | H04N 21/25841 715/810 |
| 2012/0260218 A1* | 10/2012 | Bawel | G06F 3/04815 715/841 |
| 2013/0019173 A1* | 1/2013 | Kotler | G06F 3/0482 715/711 |
| 2013/0019175 A1* | 1/2013 | Kotler | G06F 3/0482 715/728 |
| 2013/0019182 A1* | 1/2013 | Gil | G06F 3/0482 715/738 |
| 2013/0024873 A1* | 1/2013 | Hillier | G06F 9/54 719/313 |

OTHER PUBLICATIONS

Steve's Space "WPF Dynamic Context Menu", http://stevemdev.wordpress.com/2010/02/07/wpf-dynamic-context-menu/ , Feb. 7, 2010, pp. 1-2.

Adobe "Custom context menu in Flex 4 using an XML file", http://cookbooks.adobe.com/post_Custom_context_menu_in_Flex_4_using_an_XML_file-16398.html downloaded on Aug. 31, 2011, pp. 1-4.

Creating Context Menus, http://www.telerik.com/help/aspnet/treeview/tree_context_menus.html , Copyright Telerik 2002-2008, pp. 1-3.

Android, "Context Menu Android Developers" http://developer.android.com/reference/android/view/ContextMenu.html Android 3.2 r1—Aug. 30, 2011, pp. 1-3.

Context Menu, http://www.anychart.com/products/anygantt/docs/users-guide/context-menu.html#customization-and-localization downloaded on Sep. 2, 2011, pp. 1-2.

* cited by examiner

FIG. 5A

```
501 → <menumodel>
502 →   <menu id="valueMenu" root="true">
          <items>
503 {       <item id="Currency" label="kmsgViewBaseCurrency" subMenu="CurrencyMenu"/>
            <item id="Region" label="kmsgViewBaseRegion" subMenu="RegionMenu"/>
          </items>
        </menu>
        <menu id="CurrencyMenu">
          <items>
504 {       <item id="dollars" label="kmsgViewBaseDollar" hier="false" msr="false"/>
            <item id="Rupees" label="kmsgViewBaseRupees" hier="false" msr="false"/>
          </items>
        </menu>
        <menu id="RegionMenu">
          <items>
            <item id="drill" label="kmsgViewBaseDrill" hier="false" msr="false"/>
            <separator />
505 {       <item id="keepOnly" label="kmsgViewBaseSeInKeepOnly" param="action=keep" />    ⎤
            <item id="remove" label="kmsgViewBaseSeInRemove" param="action=remove" />      ⎬ 506
            <item id="column Options" label="Column Options" subMenu="columnMenu"/>        ⎦
          </items>
        </menu>
520 →   <menu id="columnMenu">
          <items>
523 {       <item id="Sort" label="kmsgViewBaseSort" hier="false" msr="false"/>
            <item id="drill" label="kmsgViewBaseDrill" hier="false" msr="false"/>     <separator />
            <item id="addMembers" label="kmsgViewBaseSeInAddMembers" rt="false" msr="false"/>
            <item id="customCalcItem" label="kmsgViewBaseSeInAddCustomCI" rt="false" msr="false"/>
            <separator />
            <item id="removeAllSteps" label="kmsgViewBaseSeInRemoveAllSteps" rt="false"/>
            <separator />
            <item id="excludeColumn" label="kmsgViewBaseExcludeColumn"/>
          </items>
        </menu>
      </menumodel>
```

SUPPORTING DISPLAY OF CONTEXT MENUS IN BOTH CASCADED AND OVERLAPPING STYLES

BACKGROUND OF THE INVENTION

1. Technical Field

The present disclosure relates to user interfaces in client systems, and more specifically to supporting display of context menus in both cascaded and overlapping styles.

2. Related Art

A context menu refers to a menu, which is displayed upon the performance of a corresponding action (e.g., right clicking of a mouse) associated with a graphical element displayed in a graphical user interface (GUI). In general, different menus are associated with different graphical elements (and/or corresponding state), and the displayed menus typically represent the choices available to the user associated with that graphical element in the corresponding context or state, as is well known in the relevant arts.

Context menus often contain menu items at different levels according to a hierarchical structure. In general, menu items at an immediately lower level are accessible by selection of (e.g., clicking on) the corresponding menu item at the parent level (i.e., immediately higher level). Thus, when menu items at a level are displayed on a display screen, a user may select one of the menu items using components such as mouse and key-boards, to cause menu items at the corresponding lower level to be displayed.

Context menus are often displayed in a overlapping style or cascaded style, when a user navigates across such multiple levels. In a overlapping style, the same area on a display screen is used to display the menu items at a child level, as that used for displaying menu items at the corresponding parent level. Such overlap is manifested by at least substantially more accentuated visibility (in the extreme case, the menu items at parent level not being visible) of the lower level menu items in the overlap areas.

Thus, the menu items at a parent level may be displayed with substantially less prominent resolution and/or color, compared to the menu items at lower level. At least in the overlap area, a user may select only the menu items of the lower level (of the hierarchy) that are displayed more prominently. The need for display in overlapping style is present particularly in mobile phone type devices, which have smaller display areas (compared to personal computers and workstations), and accordingly the style is often referred to as mobile-style also. However mobile style display can be employed in other environments as well, for example, when images are rendered by Flash Player available from Adobe Corporation, on HTML based browsers in desk-top computers.

Cascading style display of context menus is typically employed when there are less constraints as to the display area. In cascading menus, the lower level items are displayed with substantially no overlap with the menu items of the higher level, and menu items of both levels may be available for selection.

Many computing environments contain some systems which display context menus in overlapping style and other systems which display context menus in cascaded style. It is accordingly necessary to support display of menu items in both cascaded and overlapping styles.

BRIEF DESCRIPTION OF THE DRAWINGS

Example embodiments of the present invention will be described with reference to the accompanying drawings briefly described below.

FIG. 5A depicts data representing a context menu, in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A computing system provided according to an aspect of the present invention contains a server system operable to send a same context menu, associated with a same graphical element, to client systems which display the sub-menus of the hierarchical menu in a overlapping style or a cascading style. As a result, the implementation of server systems supporting such client systems may be simplified.

According to another aspect, an event handler is also implemented on the server system, to process the events generated by client system displaying menus in both the overlapping style and the cascading style. By providing a single event handler, the implementation of sever systems supporting such client systems is further simplified.

According to yet another aspect, a server system stores a in-memory representation of a context menu, and thereafter serves requests from different clients for the same hierarchical menu based on such in-memory representtaion. As data representing the context menu need not be retrieved from the data stores, the context menus can be quickly be sent to the client systems, upon corresponding requests.

According to one more aspect, a security server, implemented external to a server system, filters the specific menu items a client system (or a user using the client system) is not entitled to access. Only the remaining menu items are thereafter sent to the client system. The implementation in an external security system, may provide for enhanced security. The filters may be implemented in alternative embodiments within the client system or in the server system.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
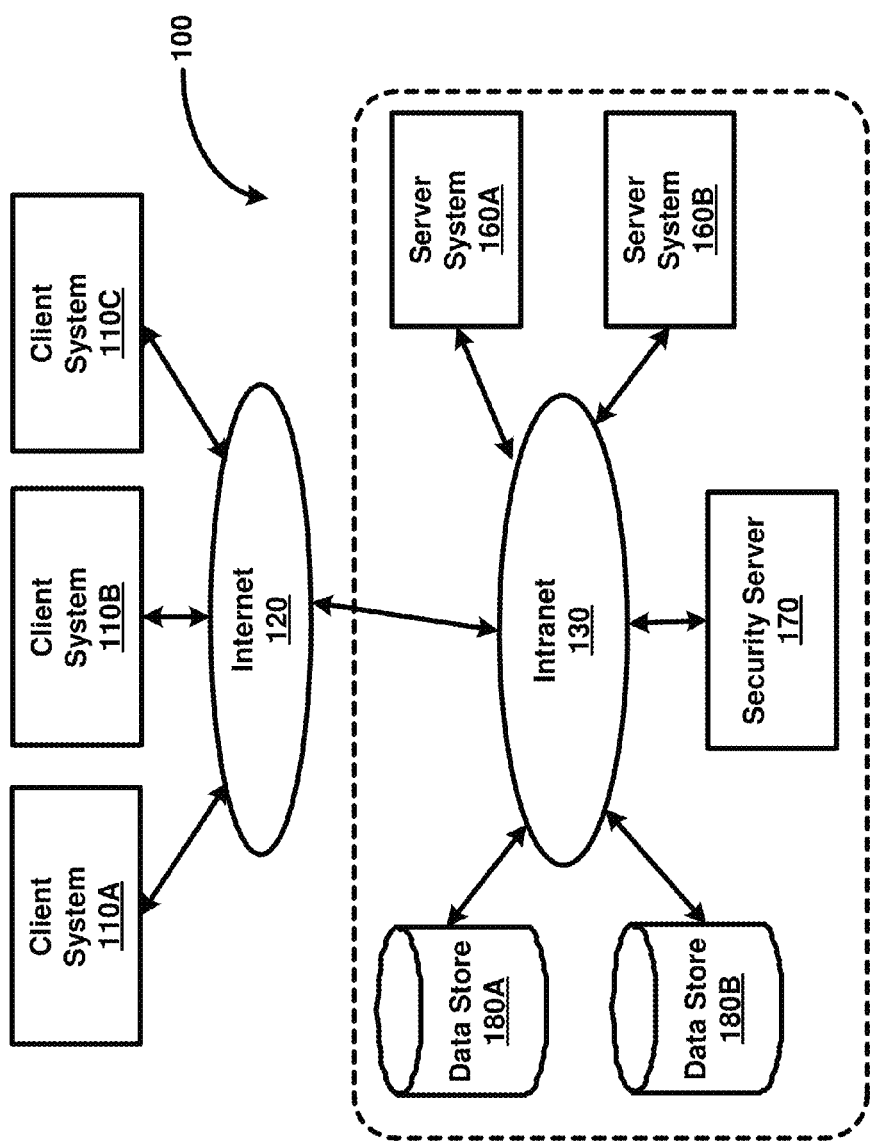
FIG. 1 is a block diagram illustrating an example environment in which several aspects of the present invention can be implemented.
Figure 2:
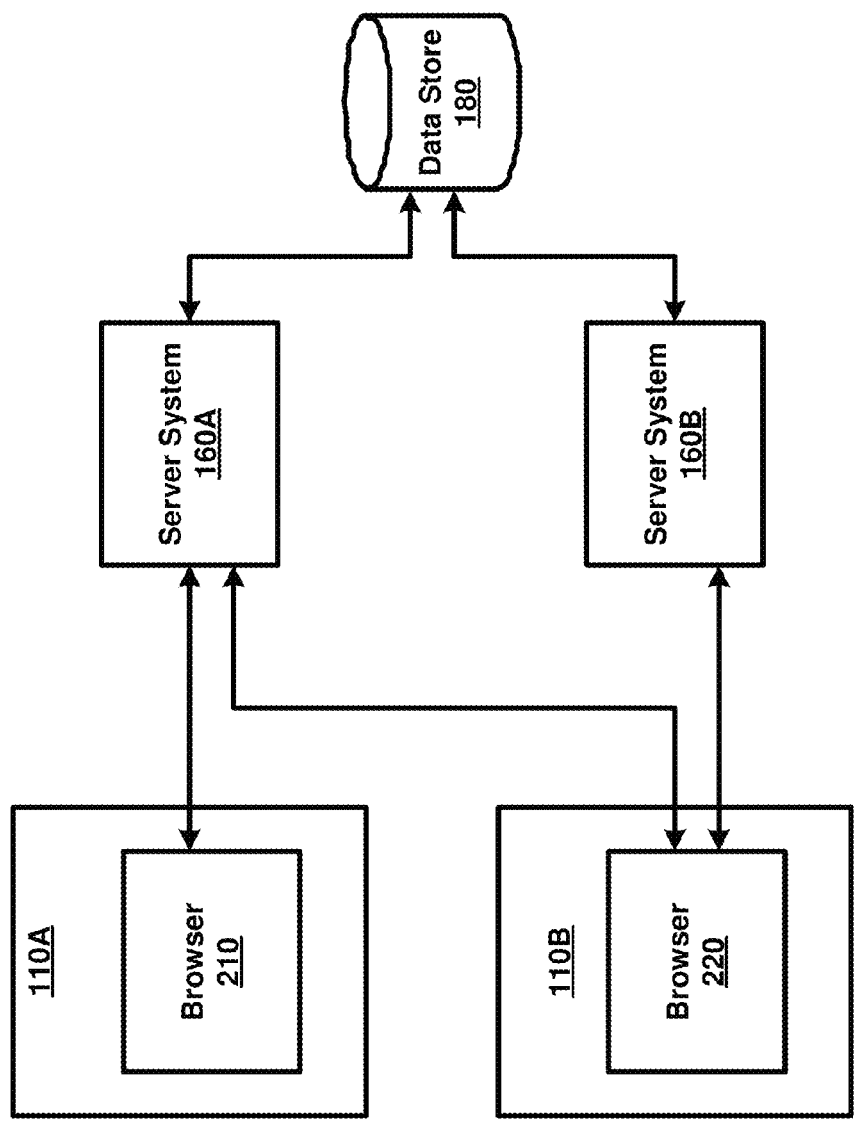
FIG. 2 depicts the view of the data flow in some of the systems of FIG. 1, in an embodiment.

FIG. 1 is a block diagram illustrating an example environment (computing system 100) in which several aspects of the present invention can be implemented. The block diagram is shown containing client systems 110A-110C, Internet 120, intranet 130, server systems 160A-160B, security server 170 and data stores 180A-180B. FIG. 2 depicts the view of the data flow in some of the systems of FIG. 1, and accordingly a combined description of the two Figures is provided below.

Merely for illustration, only representative number/type of systems is shown in FIGS. 1 and 2. Many environments often contain many more systems, both in number and type, depending on the purpose for which the environment is designed. Each system/device of FIGS. 1 and 2 is described below in further detail.

Intranet 130 represents a network providing connectivity between server systems 160A-160B, security server 170 and data stores 180A-180B, all provided within an enterprise (as indicated by the dotted boundary). Internet 120 extends the connectivity of these (and other systems of the enterprise) with external systems such as client systems 110A-110C. Each of Intranet 130 and Internet 120 may be implemented using protocols such as Transmission Control Protocol (TCP) and/or Internet Protocol (IP), well known in the relevant arts.

In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and Intranet 130. When the packet contains content such as port numbers, which specifies the target application, the packet may be said to be directed to such application as well.

Each of data stores 180A-180B represents a non-volatile (persistent) storage facilitating storage and retrieval of a collection of data by enterprise applications executing in server systems 160A-160B. For example each of the data stores 180A-180B may store data representing a corresponding portion of hierarchical menus. The portions may be linked by appropriate pointers such that the hierarchical structure can be accurately reproduced from such different portions. Such distributed storage of different portions of a menu may be required, for example, when the menu structures are large and complex.

Each of data stores 180A-180B may be implemented as a database server using relational database technologies and accordingly provide storage and retrieval of data using structured queries such as SQL (Structured Query Language). Alternatively, each of data stores 180A-180B may be implemented as a file server providing storage and retrieval of data in the form of files organized as one or more directories, as is well known in the relevant arts. Each data store is implemented as an independent hardware unit, which is addressable by a corresponding IP address.

Security server 170 represents a server executing security applications which may implement common security-related functionalities required by the enterprise. As relevant to subject matter of the subject patent application, it is sufficient to understand that security server determines the specific portions of a hierarchical menu that can be made available to a corresponding user. Thus, different users are made available different portions of a hierarchical menu, depending on the identity of the user. Security servers are implemented as separate hardware units (communicating with other systems over a network) due to considerations such as security, as is well known in the relevant arts. In case the network is implemented as IP network, security server 170 is addressable by a corresponding IP address, as well.

Each of server systems 160A-160B represents a server, such as a web/application server, executing enterprise applications capable of performing tasks requested by users ("user requests") using one of client systems 110A-110C. It may be appreciated that various enterprise applications executing in server systems 160A-160B may be part of an enterprise suite that operate together to implement diverse functionalities of the enterprise (shown as the dotted boundary).

When processing such user requests, each server system may generate hierarchical context menus suitable for use at the corresponding client system. In general, hierarchical menus provide the convenience of displaying, only that information which is of possible interest to the user, and facilitating the user to seek desired information by selection of appropriate menu items. Several aspects of the present invention simplify generation of such context menus, particularly when working with diverse types of client systems, as described in sections below.

Each of client systems 110A-110C represents a system such as a personal computer, workstation, mobile station (including a mobile phone, tablet computers with small displays), etc., used by users to generate (user) requests directed to enterprise applications executing in server systems 160A-160B. In general, a client system sends user requests to an enterprise application (for performing desired tasks) and receives corresponding responses containing the results of performance of the requested tasks. Each request may be sent in the form of an IP packet directed to the desired server system, with the IP packet including data identifying the desired tasks (including mere retrieval and presentation of corresponding information of interest) in the payload portion.

In general, at least some of the interaction by users at client systems 110A-110C is via hierarchical menus. Navigation of such menus may cause information of interest to be displayed, additional requests (events) generated, etc. The user interfaces are generally based on display units, having a corresponding size. For example client system 110A represents a device where limited area is available for displaying context menus, and client system 110B represents a device which has a larger display area in comparison to the mobile station, for displaying the context menus.

Various features of the present invention enable simplification of server implementation when such large and small display areas are used in the display of context menus. The features will be clearer in comparison with an example alternative embodiment, and accordingly such an embodiment is described first below.

3. Example Alternative Embodiment

In an embodiment, each client system provides browser type applications to receive and render the HTML content. Thus, client systems 110A and 110B are shown containing browsers 210 and 220, respectively. Client system 110A is assumed to have a smaller display area, compared to client system 110B, for displaying the context menus. A smaller display area may be present for client systems, for example, when implementing software such as Adobe Corporation's Flash Player software. On the other hand, larger display areas may be available for client systems, for example, when client systems render HTML content (using JavaScript) for providing the context menus.

With respect to client system 110B, the HTML content often includes data representing the graphical elements (e.g., <img> tag) and the corresponding context menus. The context menus are provided by execution of JavaScript specified associated with the corresponding graphical elements in the HTML content. The JavaScript program specifies the appropriate context menus to be displayed upon a corresponding user action (e.g., right click). The Java Script based renderers are often designed to provide user interfaces in cascaded style, that is, a child level sub-menu is rendered to have limited overlap with the parent level sub-menu. The Java Script program further handles the navigation of the hierarchical menu. When a user input requires an action (unrelated to simple navigation) to be performed, a corresponding event is invoked for handling by the appropriate event handler.

In case of client system 110A, web browser 210 may receive HTML content representing the graphical elements (e.g. Object tag) which may include a .swf file (ActionScript file) associated with a region of the display area. Execution of the ActionScript file causes the image encoded in the file to be displayed in the corresponding region. The ActionScrip further processes user actions according to the logic specified by the programmer. Context menus, embedded within the ActionScript, are displayed upon the corresponding specified user actions.

The ActionScript based renderers are often designed to provide user interfaces in overlapping style, that is, a child level sub-menu is rendered with more/complete overlap with the parent level sub-menu. The Action Script program further handles the navigation of the hierarchical menu. When a user input requires an action (unrelated to simple navigation) to be performed, a corresponding event is invoked.

In one prior approach, different servers are used to provide the respective content (i.e., JavaScript in case of client system 110B and ActionScript in case of client system 110A). As a result, the context menus sent are also different (i.e., not necessarily coordinated) even for a similar context (e.g., same graphical element in a corresponding web page). Such a requirement to have multiple servers caused enhanced overhead for the developers and the providers of the server infrastructure (shown within dotted lines in FIG. 1).

Several aspects of the present invention address at least some of such disadvantages, as described below with examples.

4. Display of Context Menus in Disparate System

Figure 3:
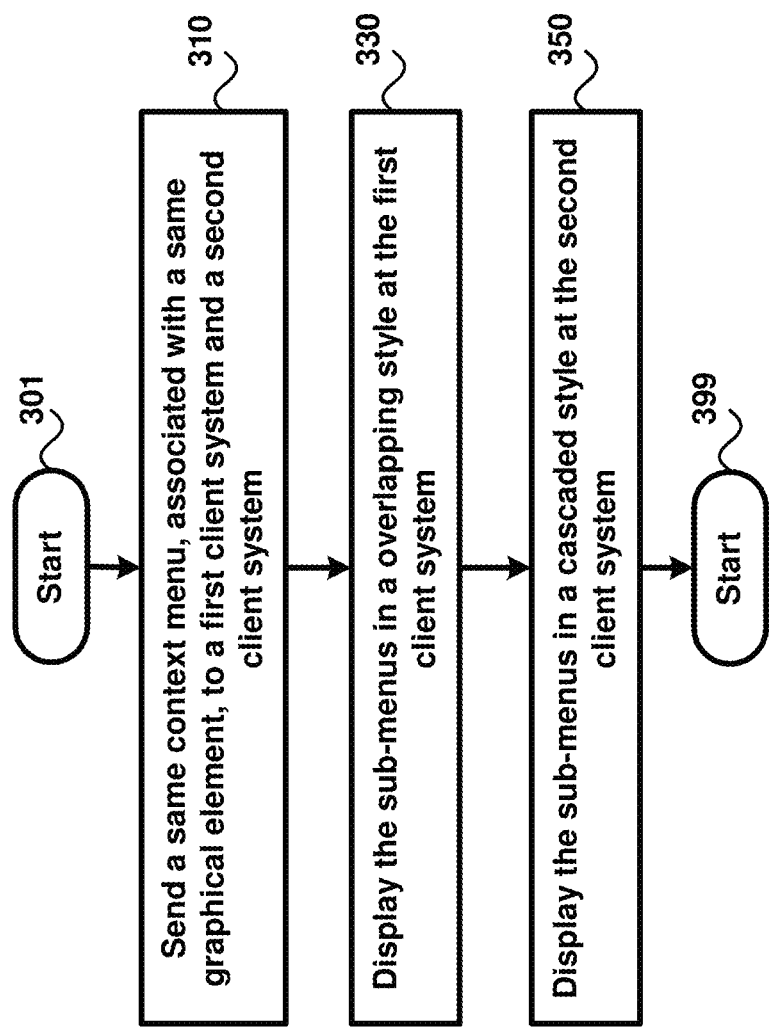
FIG. 3 is a flow chart illustrating the manner in which context menus are displayed according to an aspect of the present invention.

FIG. 3 is a flow chart illustrating the manner in which context menus are displayed according to an aspect of the present invention. The flowchart is described with respect to specific systems of FIGS. 1 and 2 merely for illustration. However, many of the features can be implemented in other environments (and also other systems) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, server system 160A sends a same context menu, associated with a same graphical element, to client system 110A and client system 110B. The context menus are said to be the same since the same menu elements with identical structure are sent associated with the graphical element. As noted above, the context menu is a hierarchical menu containing at least two sub-menus, with the menu at a lower level accessible by selection of the corresponding parent at a higher level.

A graphical element is said to be the same, even though presented on two different client systems, by considering the corresponding contexts in the respective client machines. Typically, the visual display or overall view (containing the same graphical element) is similar or same on the corresponding display unit (indicating the same context). Assuming the graphical elements are displayed in the same view (e.g., chart vs. table, for same objects), the same graphical element may be displayed using a similar graphical representation (again indicating the same context).

It may be appreciated that the different context menus may be sent associated different user actions (e.g., right click in case of a graphical element vs. moving of data from one location to the other, in a table). Accordingly, information indicating the specific user action may also be considered as a part of such a context which determines the specific context menu sent. The graphical elements may also be identified (e.g., by appropriate numbering) within server system 160A with a same number, such that the graphical elements are identified to be the same. Such numbers may also be included in communicating the context (the same graphical element).

It may be observed that the context menu can be sent integral to the web page, or later, for example, upon corresponding user action requiring the context menu to be displayed. When sent integral to the web page, the web page definition contains data defining the applicable contexts, the potential user actions with respect to corresponding graphical elements in the specific context, and the specific context menu to be displayed upon a user action with respect to the corresponding graphical element.

On the other hand, the client system may asynchronously (using technologies such as AJAX) request the applicable context menu when the user performs a corresponding user action with respect to a graphical element. In response to the user action, the client system may send identifiers of the graphic element, user action (and any necessary data integral to the user action, for example, the destination/source column/row information in case of a move user action), and context (e.g., container identifier in case of OBI Enterprise Edition 11g, available from Oracle Corporation).

In step 330, client system 110A displays the sub-menus in an overlapping style at the first client system. An overlapping style implies that the menu items at a child level are displayed (upon selection of the menu item at the parent level) in the same area as in which the menu items at the parent level were displayed, as also noted above.

In step 350, client system 110B displays the sub-menus in a cascaded style. As noted above, cascaded style implies that the areas used for displaying the sub-menus have very limited overlap, if at all. In one scenario, client system 110B displays the menu items of the second/lower level with no overlap (with the display of the menu items of the first/high level), while client system 110A displays the menu items at the lower level to completely overlap the same area on which the menu items of the first level are displayed (such that the menu items of the first level are not displayed entirely when the menu items of the second level are displayed).

According to another aspect, in client system 110A, the menu items of the first level are not available for selection when the menu items of the second level are displayed and available for selection. The flowchart ends in step 399.

The implementation of server system 160A is simplified since both types of client systems are designed for receiving the same context menu for the same context, while each client system retains the choice of displaying in formats suitable for small display areas (as for client system 110A) or larger display areas (client system 110B).

The manner in which server system 160A may construct and send such context menus according to another aspect of the present invention is described below with examples.

5. Construction of Context Menus

Figure 4:
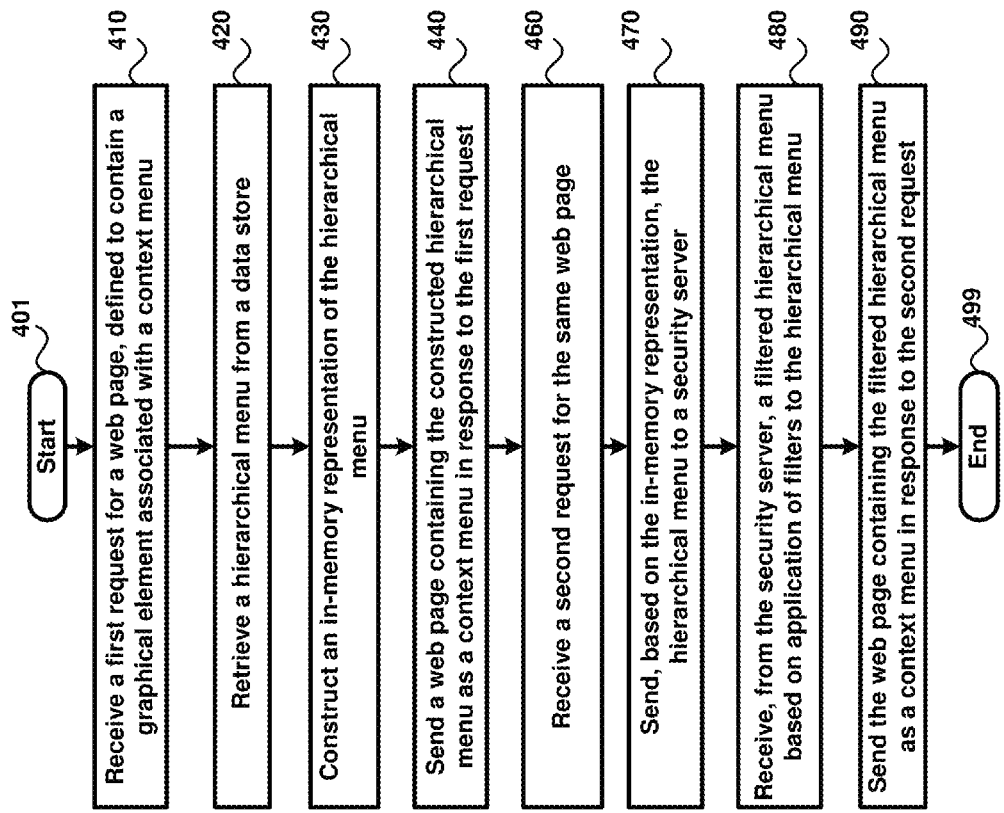
FIG. 4 is a flow chart illustrating the manner in which context menus are served by a server system according to an aspect of the present invention.

FIG. 4 is a flow chart illustrating the manner in which context menus are constructed according to an aspect of the present invention. The flowchart is described with respect to specific systems of FIGS. 1 and 2 merely for illustration. However, many of the features can be implemented in other environments (and also other systems) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 401, in which control immediately passes to step 410.

In step 410, server system 160B receives a first request for a web page, defined to contain a graphical element associated with a context menu. The request may be received from client system 110A upon a corresponding action by a user. The web page may be specified by a Uniform Resource Locator (URL), which is included in an IP packet, that further identifies that the packet/request originated from client system 110A.

In step 420, server system 160B retrieves a hierarchical menu from data store 180A. The menu may be identified (by server system 160B) based on the content of a web page template, which includes the graphical element. Thus, the template definition may specify that the hierarchical menu is associated with the graphical element (using a unique object identifier). The template definition may further contain the static content for the web page sought to be sent as a response, and also identify the manner in which any dynamic content is to be generated and incorporated to construct the web page.

In step 430, server system 160B constructs an in-memory representation of the hierarchical menu. In other words, the hierarchical menu is stored in a random access memory (in memory representation). The representation includes data to indicate the specific menu items as well as the interconnection between them according to the hierarchical structure, suitable for navigation. Such stored information is further maintained as such, for serving future user requested as described below. In step 440, server system 160B sends a web page containing the constructed hierarchical menu as a context menu in response to the first request.

In step 460, server system 160B receives a second request for the same web page (specified by the same URL) from client system 110B. For illustration, it is assumed that the request is received from another user (or client system), which is entitled to a different security/access level, with respect to the content of the context menu served in step 440.

In step 470, server system 160B sends, based on the in-memory representation, a hierarchical menu to security server 170. In other words, the data forming the menu need not be retrieved from the data store, since in-memory representation contains the corresponding information. Security server 170 may filter out the specific portions of the hierarchical menu the corresponding user is not entitled to access, and provide only the remaining portions of the menu back to server system 160B. Accordingly, security server 170 may need to be provided the appropriate identity information of the user causing the second request to be generated at client system 110B.

In step 480, server system 160B receives, from security server 170, a filtered hierarchical menu. In step 490, server system 160B sends the filtered hierarchical menu as a response to the second request. The flow chart ends in step 499.

Thus, in the illustrative example of FIG. 4, the URL and the object identifier together uniquely identify the same graphical element sent to different client systems. Furthermore, while the description above is provided assuming that the context menus are sent integral to the web pages, it should be appreciated that alternative embodiments can be implemented where the context menu is sent asynchronously (using AJAX type technologies well known in the relevant arts) based on the in-memory representation as described with respect to FIG. 4, upon occurrence of a corresponding user action with respect to specific graphical elements (as specified in the displayed web page).

It may be further appreciated that the same context menu is served to both client systems (assuming equal access privileges), also because the information is rooted in the same information retrieved from data store 180A. In addition, the performance of server system 160B is enhanced since the in-memory representation of the menu structure is used to serve any subsequently received requests for any portion of the hierarchical menu. The features are illustrated with respect to example data below.

6. Example Data

FIG. 5A depicts data representing a context menu in an embodiment. The menu is shown represented in the form of XML and containing two sub-menus at the highest level. The corresponding hierarchical menu is shown as an in-memory representation in RAM (random access memory) 550 of FIG. 5C.

Data portion 503 represents the level 1 menu items of 'Currency' and 'Region'. Data portion 504 represents level 2 menu items of 'Dollars' and 'Rupees' as children of 'Currency'. Data portion 506 similarly depicts the children of (parent) menu item 'Region'.

Figure 5B:
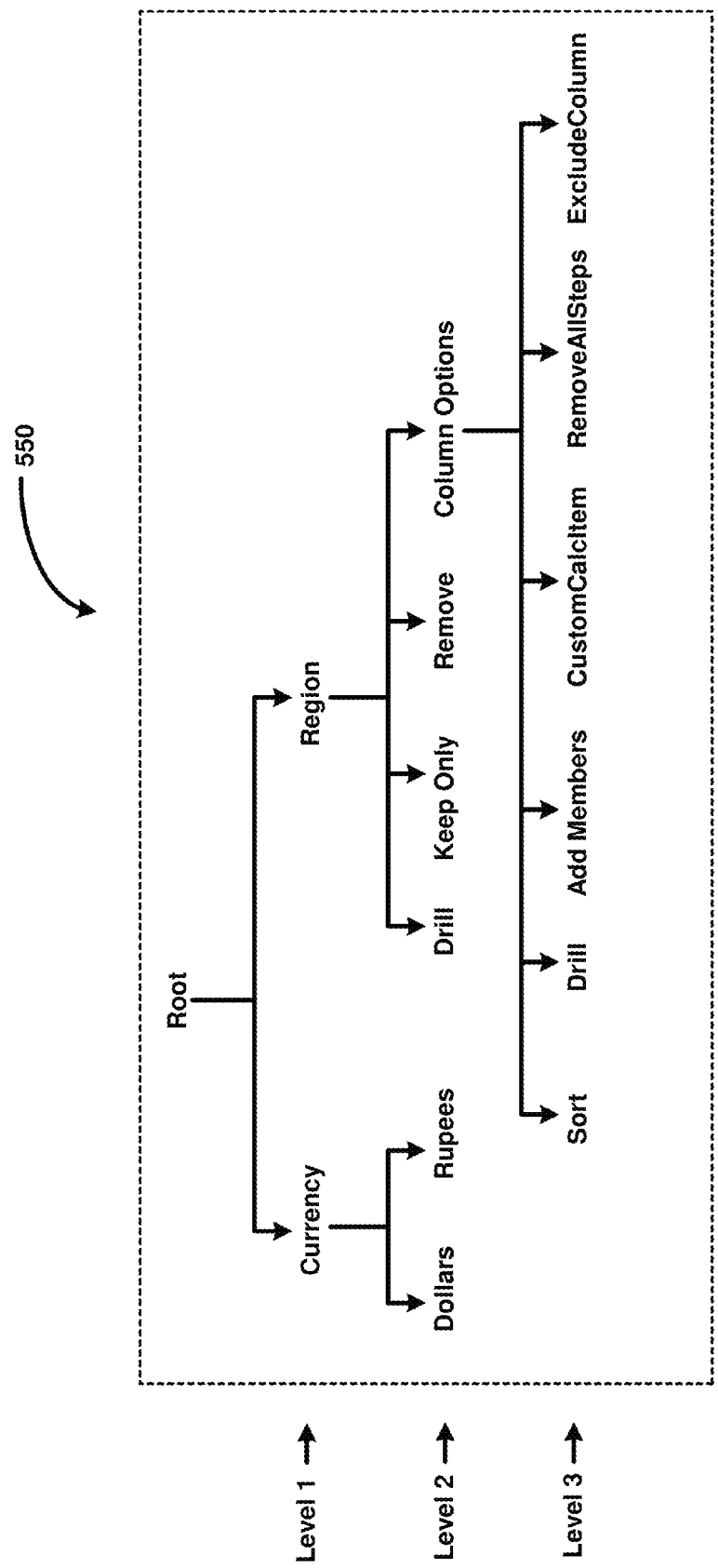
FIG. 5B depicts a hierarchical menu as an in-memory representation, in an embodiment.

Line 505 specifies subMenu="columnMenu" to point to the sub-menu shown starting at line as being a child of 'Column Options', though any other suitable convention can be used to provide the link. Data portion 523 represents the children (in level 3) of parent menu item 'Column Options', as depicted in FIG. 5B.

It may be readily observed that the keyword subMenu provides a mechanism by which lower level menus can be specified in a linked format (contrasted with a nested format, which could have required the data representing the lower level menu to be embedded within the tag data corresponding to the parent level menu item).

By having the ability to specify the lower level sub-menus in a linked format, the ease of representation of the desired hierarchical structure and access of desired sub-menus is simplified. In particular, since each sub-menu is accessed using the corresponding label alone, the representation and access of the sub-menus is simplified.

It should be further appreciated that the context menu structure (of XML format) may be stored in a corresponding file, external to the program logic/code that constructs the responses (including the context menus) to client requests. As a result, the context menu content/structure can be altered without altering the logic/code.

The manner in which the features described above can used, is illustrated with respect to example user interfaces.

7. Example User Interfaces

Figure 6A:
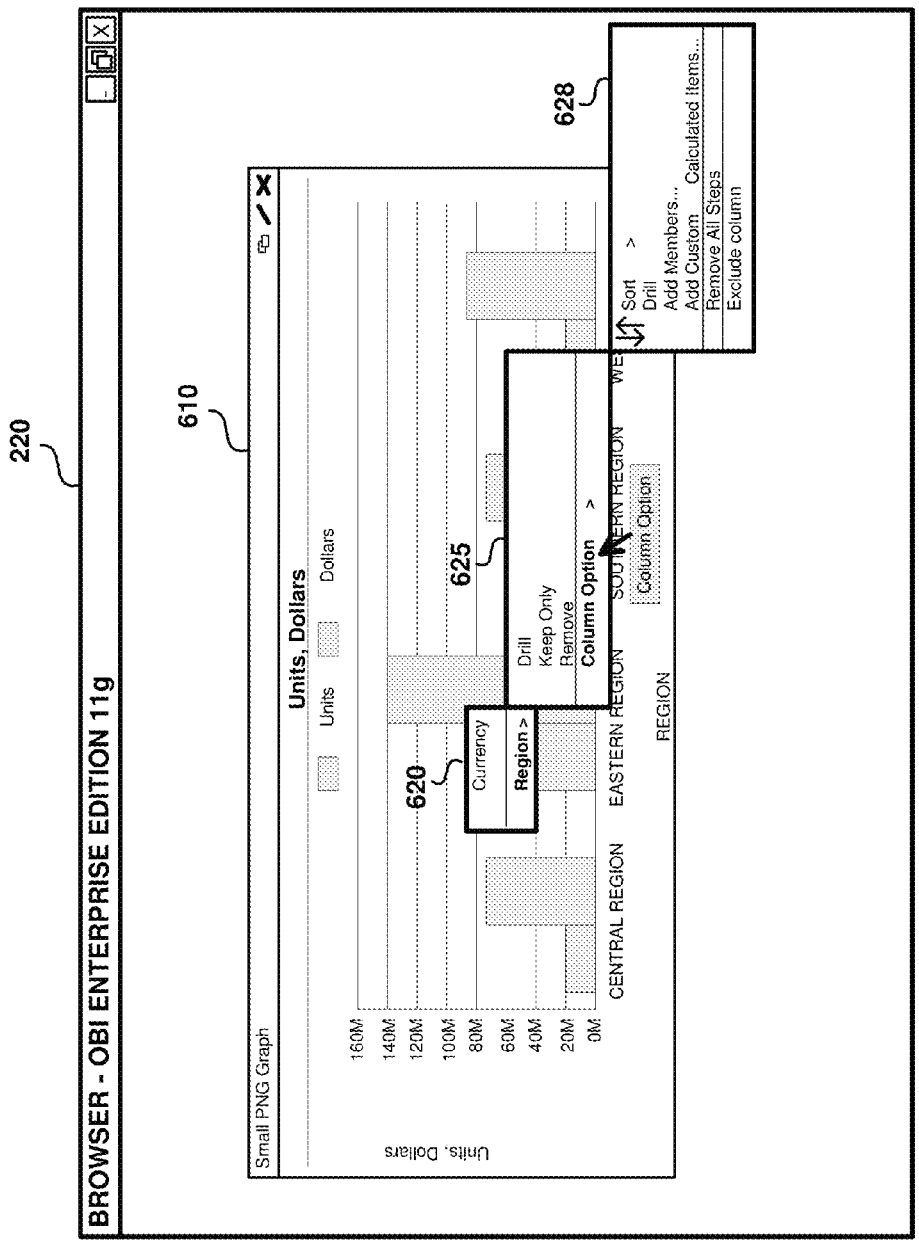
FIG. 6A depicts the cascaded display of sub-menus in one embodiment.

FIG. 6A depicts several graphical elements/objects for corresponding regions, displayed on a display screen associated with client system 110B (having a large display screen). The graphical elements are shown displayed in the context of browser 220, for example, based on a HTML web page received from server system 160A.

Once graphical chart 610 is displayed, the user is assumed to have right-clicked on Eastern Region (or the graphical object corresponding to Eastern Region), causing sub-menu 620 (at level 1 of FIG. 5C) to be displayed. The user is then assumed to have selected 'Region' in sub-menu 620, causing sub-menu 625 (at level 2 of FIG. 5C) to be displayed. The user is thereafter assumed to have selected 'Column Option' menu item, causing sub-menu 628 (at level 3 of FIG. 5C) to be displayed, as depicted in FIG. 6A.

Due to the larger display screen, all the three sub-menu are shown displayed in a cascaded matter, i.e., with no or minimal over-lap. Thus, sub-menu 620 is displayed upon a user action (e.g., right click), sub-menu 625 is displayed after selection of menu item in sub-menu 620, and sub-menu 628 is selected after selection of menu item in sub-menu 628. Any menu item in 620/625/628 can be selected by a user due to the cascaded display of the sub-menus. However, such a cascaded display may not be suitable in mobile phones type of devices having small display areas, and the corresponding interaction is depicted in FIGS. 6B-6D.

Figure 6B:
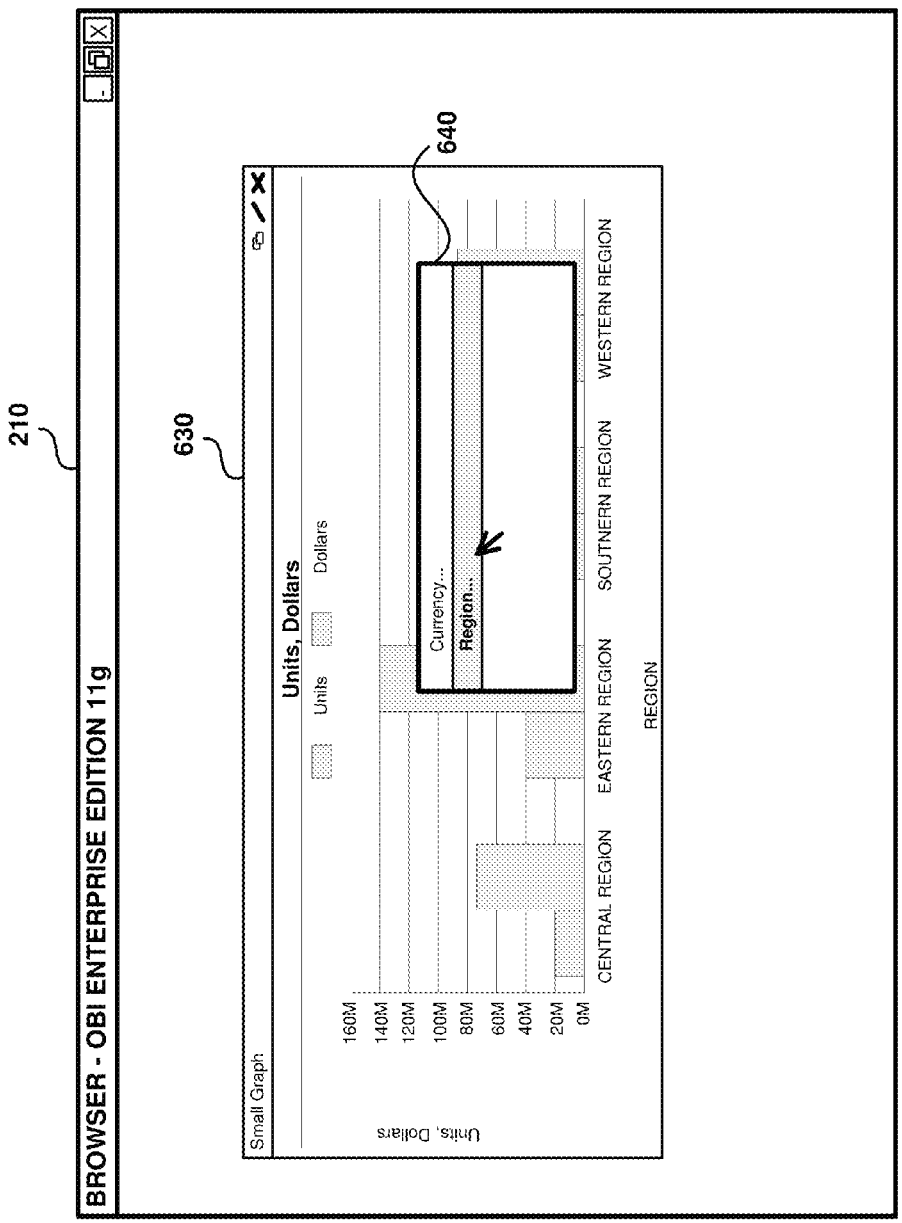
FIG. 6B-6D together depicts the overlapping display (mobile style) of sub-menus in one embodiment.
Figure 6C:
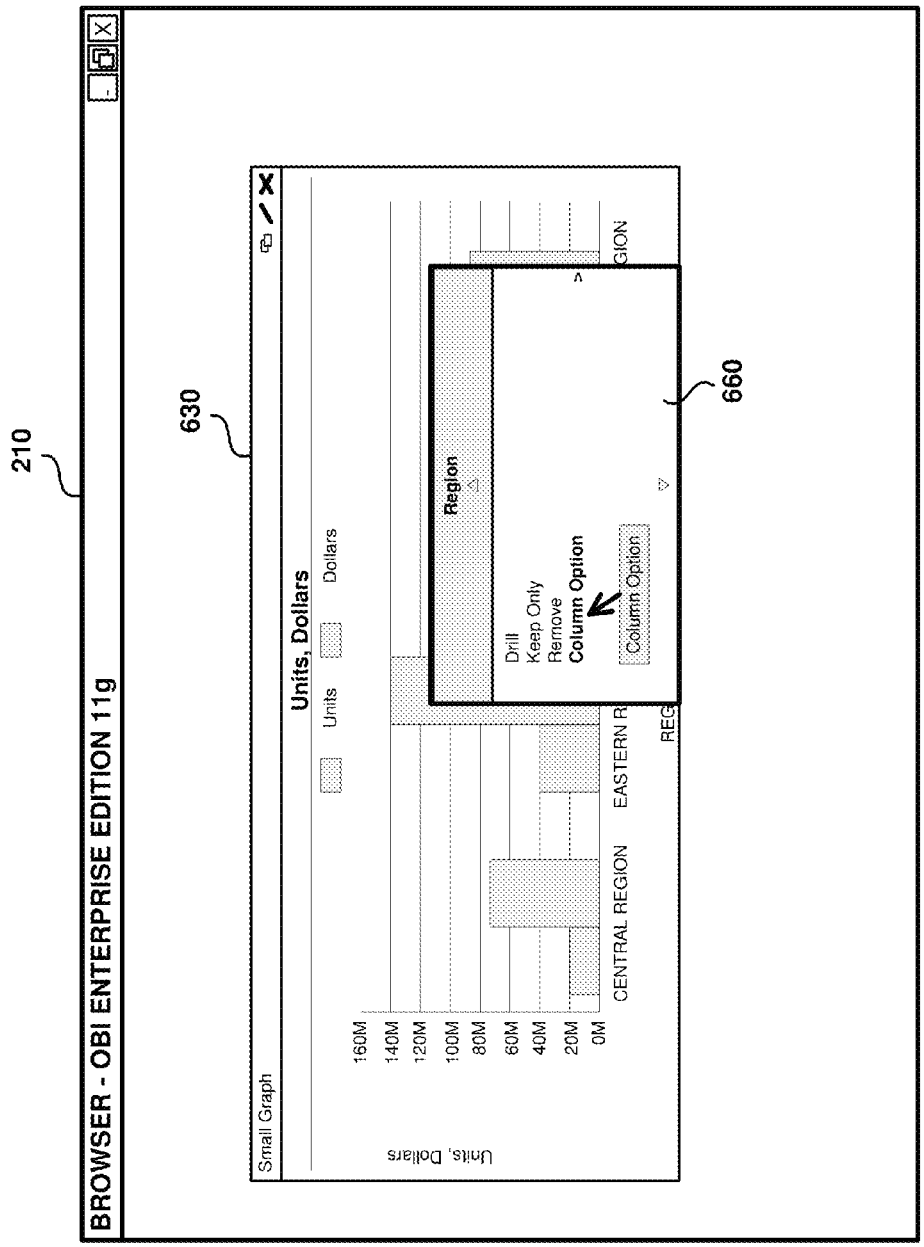
Figure 6D:
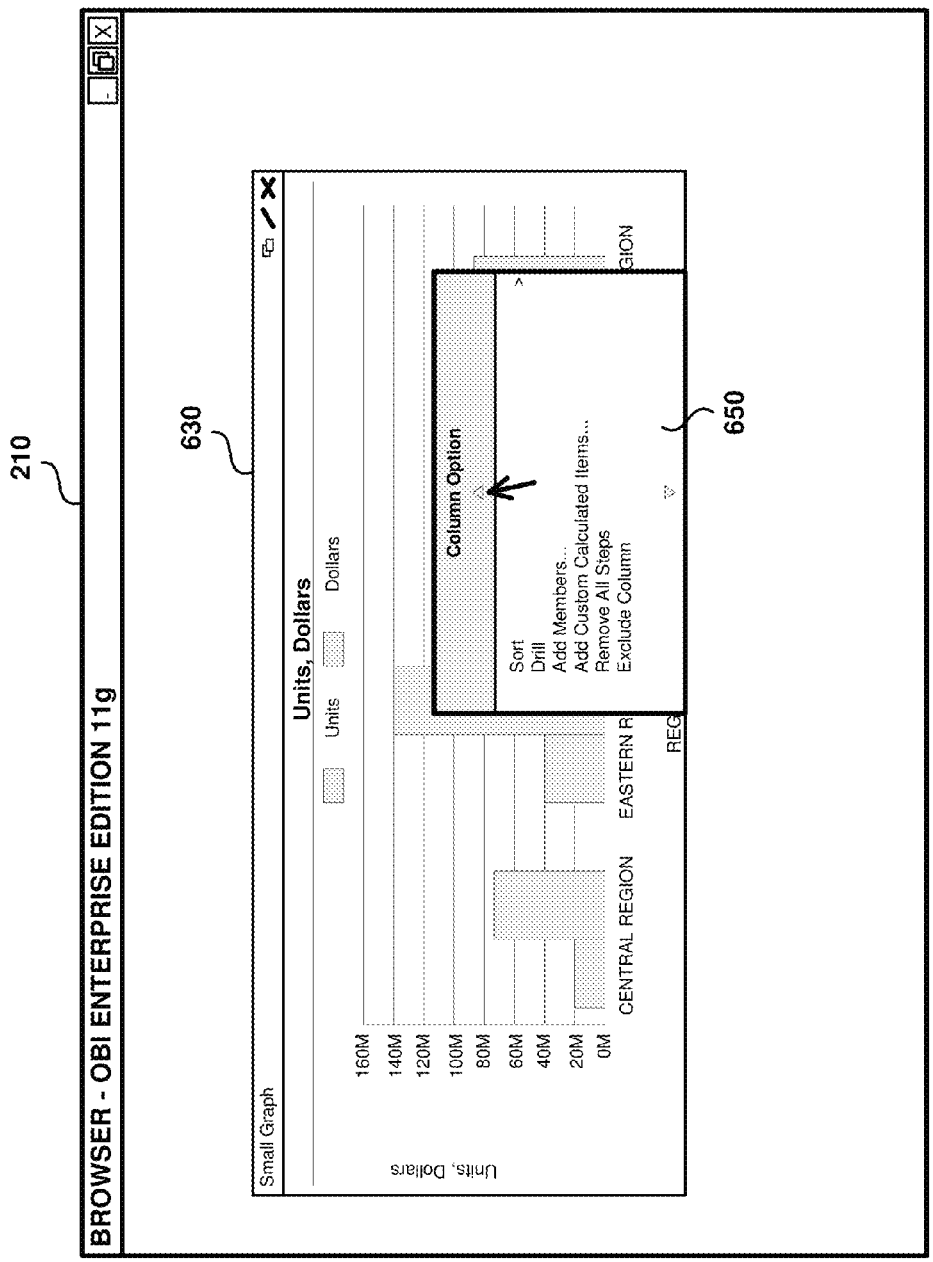

FIGS. 6B-6D depict the display of context menu associated with a same graphical object as in FIG. 6A. FIG. 6B depicts sub-menu 640 containing level 1 menu items of FIG. 5B. Assuming the user selects 'Region' parent menu item in sub-menu 640, display changes to that depicted in FIG. 6C. There is shown sub-menu 660, which completely overlaps the entire area used for displaying sub-menu 640. Similarly, when user selects 'Column Option' parent menu item, the same area is used for displaying sub-menu 650.

Thus, the sub-menu containing the parent is not available for selection, when the lower level menu items are displayed. Even if the higher level menu items are partially displayed in alternative embodiments, a user may not be able to select such menu items (and only the lower level menu items are selectable).

Some of the features described above are illustrated below in further detail with respect to various frameworks.

8. Frameworks

Figure 7:
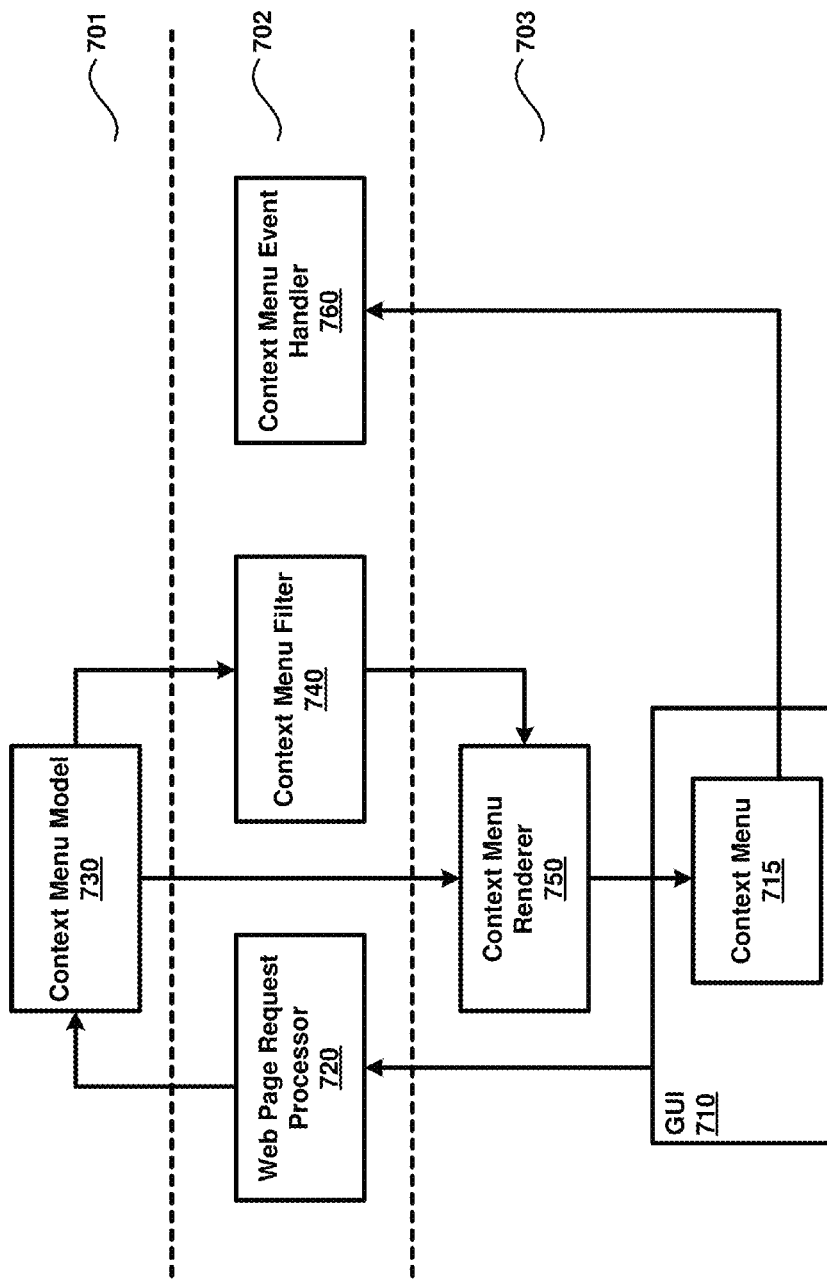
FIG. 7 is a block diagram illustrating the details of the operational framework of various systems, in an embodiment.

FIG. 7 is a block diagram illustrating the details of the operational framework of various systems described above. The blocks of tiers 701 and 702 are present in server systems 160A-160B and security server 160C, while the blocks of tier 703 are present in each client system (as described further with respect to FIG. 8 below). The blocks of each tier are described below in further detail.

Web Page Request Processor 720 represents a module which processes various requests for web pages. As noted above, the hierarchical menu may be retrieved from the corresponding data store, if required. Context menu model 730 represents the in-memory representation of such hierarchical menu. Context menu filter 740 removes some of the menu items the specific user may not be permitted to access, before sending the permitted menu items in the form of a hierarchical menu for display.

Context Menu Event handler 760 executes the actions (see, for example, 'remove' in portion 506 of FIG. 5A) specified corresponding to the selected menu item. In general, a software code is associated with each of such actions, and such code is executed for performing the action. Event handler 760 accordingly contains the program logic to execute the software code corresponding to each action specified in the hierarchical menus. It should be appreciated that the same event handler is used to process the events generated by client systems using either the overlapping style or the cascading style of display, thereby simplifying the implementation of server systems.

Context menu renderer 750, may include a server interface module which operates to receive the hierarchical context menu 715 (from either filter 740 or menu model 730, in case security concerns are inapplicable) from server system 160A via Internet 120. The menu is stored in a local memory (e.g., random access memory, shown in FIG. 8 as well).

A user interface module (also contained renderer 750) provides a user interface to enable a user to navigate the hierarchical menu provided in such a local memory. Thus, the menu items of the root sub-menu are displayed first, and the user can thereafter select menu items of interest for additional detail. In case of client system 110A (with smaller display area), the sub-menus are displayed in overlapping style (as depicted with respect to FIGS. 6B-6D. On the other hand, in case of client system 110B (with larger display area), the sub-menus are displayed in cascaded style.

It may thus be appreciated that the implementation on client systems is also simplified since the interface with the server can be implemented using the same server interface, while different implementations are provided for just the rendering aspect (based on the data provided by the server interface).

The menu is rendered and navigated in the context of graphical user interface 710. Context menu 715 represents the specific sub-menus that are presently rendered on the display unit. GUI 710 further operates to process the inputs from devices such as key-boards and pointer devices, to provide several features of the present invention described above. Due to the approaches thus adopted, Context menu renderer 750, Context Menu Event handler 760, Context menu filter 740 may be implemented/developed in any programming language such as JavaScript, ActionScript etc based on the requirement of the enterprise.

Figure 8:
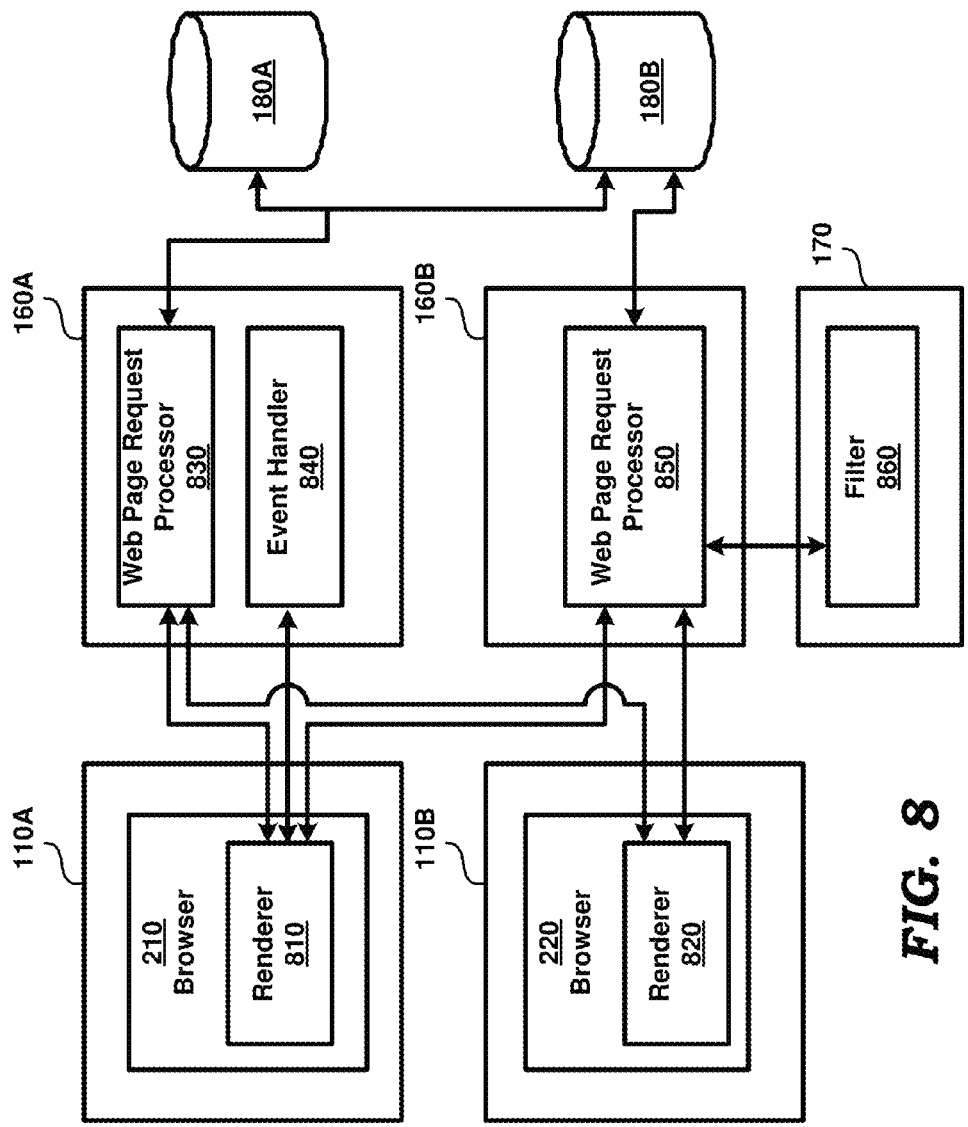
FIG. 8 depicts implementation of various blocks of FIG. 7, as respective software modules in corresponding systems, in an embodiment

FIG. 8 depicts implementation of various blocks as respective software modules in corresponding systems. As may be readily observed, web page request processor 830/850 may be designed to construct menu items based on sub-menus stored in a data store, when responding to web page request.

Renderers 810 and 820 are provided within the context of browsers 210 and 220. It should be appreciated that renderer 810 provides the interface depicted with respect to FIGS. 6B-6D, while renderer 820 provides the interface depicted with respect to FIG. 6A. In either case, server system 160A sends the same context menu.

Event handler 840 handles (or processes) the events received from both client systems 110A and 110B. Filter 860 can be implemented within server systems 160A/160B as well, and operates to provide filtered context menus, excluding those portions of the menu that the corresponding client system (or user thereon) is not entitled to access. In other words, only those portions of the context menu that a corresponding user is entitled to access, are sent to the corresponding client system.

It should thus be appreciated that client systems may operate based on the same hierarchical menus (for the same context), irrespective of whether the menus are rendered in cascaded style or the overlapping style.

It should be further appreciated that the features described above can be implemented in various embodiments as a desired combination of one or more of hardware, executable modules, and firmware. The description is continued with respect to an embodiment in which various features are operative when the software instructions described above are executed.

9. Digital Processing System

Figure 9:
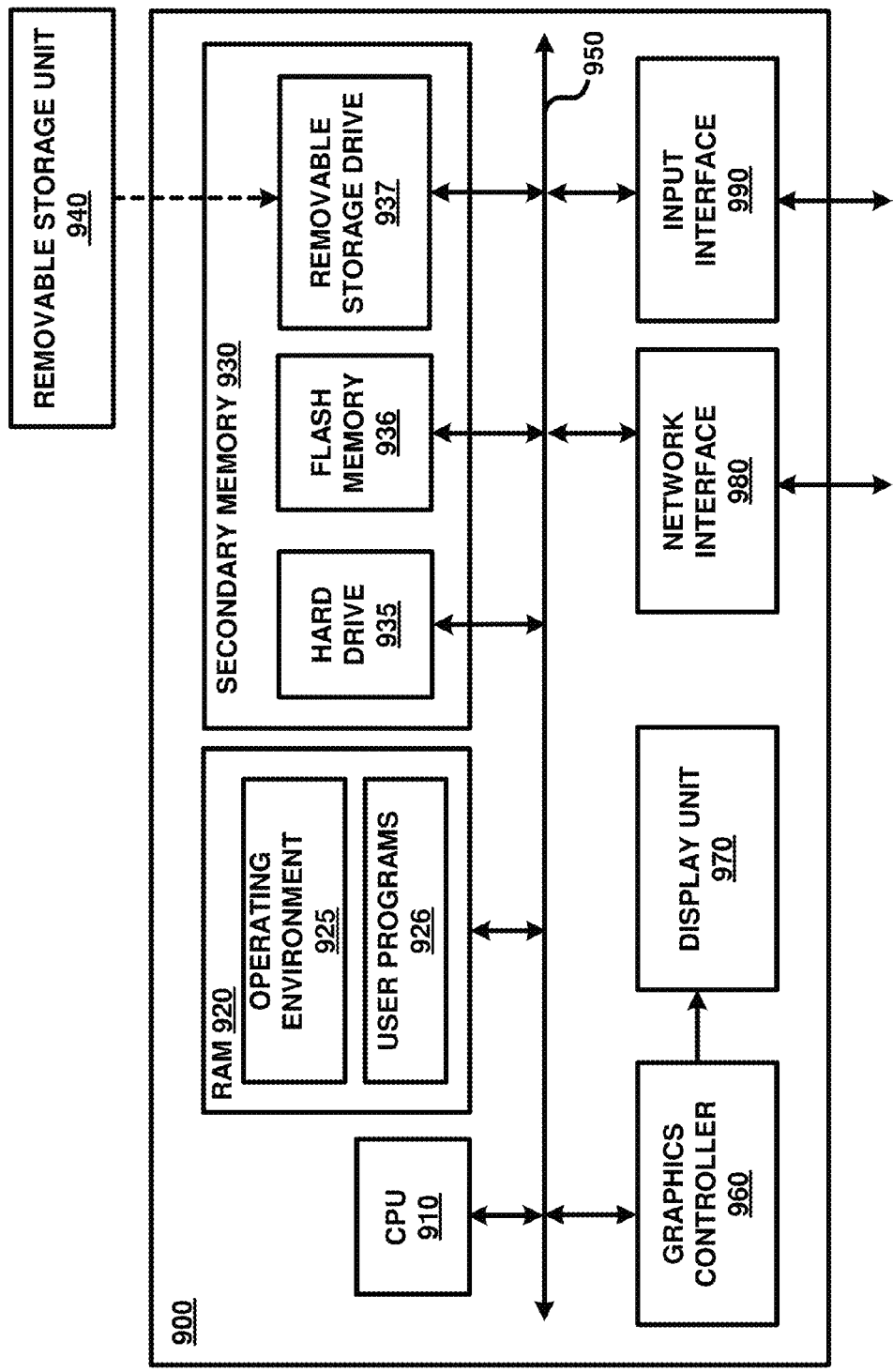
FIG. 9 is a block diagram illustrating the details of a digital processing system in which various aspects of the present invention are operative by execution of appropriate software instructions.

FIG. 9 is a block diagram illustrating the details of digital processing system 900 in which various aspects of the present invention are operative by execution of appropriate executable modules. Digital processing system 900 may correspond to either server system 160A or client system 110A (with smaller display area/screen) executing software applications (for example enterprise applications as noted above).

Digital processing system 900 may contain one or more processors (such as a central processing unit (CPU) 910), random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention (e.g., the flow chart of FIGS. 3 and 4 in case of server system 160A, or the user interfaces of FIGS. 6B-6D in case of client system 110A). CPU 910 may contain multiple processing units, with each processing unit potentially being designed for a specific task. Alternatively, CPU 910 may contain only a single general-purpose processing unit.

RAM 920 (corresponding to RAM 550 when system 900 corresponds to server system 160A/160B) may receive instructions from secondary memory 930 using communication path 950. RAM 920 is shown currently containing software instructions constituting shared environment 925 and/or user programs 926 (such as networking applications, database applications, enterprise applications etc.). Shared environment 925 contains utilities shared by user programs, and such shared utilities include operating system, device drivers, virtual machines, flow engine, etc., which provide a (common) run time environment for execution of user programs/applications.

Graphics controller 960 generates display signals (e.g., in RGB format) to display unit 970 based on data/instructions received from CPU 910. Display unit 970 contains a display screen to display the images defined by the display signals (such as the user interface shown in FIGS. 6A-6D). Input interface 990 may correspond to a keyboard and a pointing device (e.g., touch-pad, mouse) and may be used to provide the user inputs required for several aspects of the present invention (such as those provided for interacting with the user interfaces shown in FIGS. 6A-6D). Network interface 980 provides connectivity to a network (e.g., using Internet Protocol), and may be used to communicate with other connected systems (such as client systems 110A-110C, data store 180A-180B, etc.) of FIG. 1.

Secondary memory 930 (representing a non-transitory storage/medium) may contain hard drive 935, flash memory 936, and removable storage drive 937. Secondary memory 930 may store the data and software instructions (for example, for performing the various features described above), which enable digital processing system 900 to provide several features in accordance with the present invention.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
a server system operable to send a context menu associated with a first graphical element, said context menu containing a first sub-menu and a second sub-menu, wherein said second sub-menu is represented as a child of a parent menu item contained in said first sub-menu;
a first client system to receive said context menu associated with said first graphical element, and display said first sub-menu and said second sub-menu in an overlapping style on a first display unit associated with said first client system, wherein said context menu is displayed in a first display area on said first display unit; and
a second client system to also receive said context menu associated with said first graphical element, and then display said first sub-menu and said second sub-menu in a cascaded style on a second display unit associated with said second client system, wherein said context menu is displayed in a second display area on said second display unit, wherein said first display area is smaller than said second display area,
wherein said second sub-menu is displayed upon selection of said parent menu item in each of said first client system and said second client system,
wherein said first sub-menu and said second sub-menu are displayed in said cascading style in said first client system in view of said first display area being smaller than said second display area.

2. The computing system of claim 1, wherein each of said first client system and said second client system displays a corresponding web page containing said first graphical element,
each of said first client system and said second client system displaying said first sub-menu upon a first user action with respect to said first graphical element displayed on the corresponding web page,
wherein said selection is performed based on said displaying of said first sub-menu.

3. The computing system of claim 2, wherein said context menu is provided by said server system to each of said first client system and said second client system within said corresponding web page, wherein said corresponding web page sent by said server system contains data representing said context menu.

4. The computing system of claim 2, wherein said first client system receives said first user action with respect to said first graphical element displayed in said corresponding web page, and in response communicates with said server system to indicate that said first user action has been performed with respect to said first graphical element, and receives said context menu asynchronously as a response from said server system.

5. The computing system of claim 2, wherein said first user action from each of said first client system and said second client system invokes a single event handler executing in said server system.

6. The computing system of claim 2, wherein said first sub-menu contains a first set of menu items and said second sub-menu contains a second set of menu item,
wherein each of said first set of menu items are available for selection in said second client system when said second set of menu items are displayed on said second display unit,
wherein said first set of menu items are unavailable for selection in said first client system when said second set of menu items are displayed on said first display unit.

7. The computing system of claim 2, wherein said server system is operable to:
maintain an in-memory representation of said context menu in a volatile memory;
receive a third request for a context menu for said graphical element;
retrieving said context menu from said volatile memory, in response to said receiving of said third request, wherein said in-memory representation is present in said volatile memory before receiving of said third request;
sending said context menu as a response to said third request.

8. The computing system of claim 7, wherein said server system is further operable to:
receive a fourth request from a second user;
in response to receiving said fourth request:
retrieving said context menu from said volatile memory;
sending the retrieved context menu to an external security server, which applies a second set of filters applicable to said second user, to generate a filtered context menu;
receiving said filtered context menu and sending the received filtered context menu as a response to said fourth request,
whereby said context menu is retrieved only once from a data store in processing multiple requests received from different users.

9. The computing system of claim 1, wherein said first display unit has a smaller display screen compared to said second display unit such that said first display area is a small display area and said second display area is a large display area,
wherein said first client system determines that said first sub-menu and said second sub-menu are to be displayed in said overlapping style in view of said first display area having said small display area,
wherein said second client system determines that said first sub-menu and said second sub-menu are to be displayed in said cascading style in view of said second display area having said large display area.

10. The computing system of claim 1, wherein said context menu is rendered in said first client system by a first application in a small display area such that said first display area is said small display area,
wherein said context menu is rendered in said second client system by a second application in a large display area such that said second display area is said large display area.

11. A non-transitory computer readable medium storing one or more sequences of instructions, wherein execution of said one or more sequences of instructions by one or more processors contained in a server system causes said server system to support context menus in client systems, wherein execution of said one or more instructions by one or more processors contained in said server system causes said server system to perform the actions of:
sending a context menu associated with a first graphical element to both a first client system and a second client system, said context menu containing a first sub-menu and a second sub-menu, wherein said second sub-menu is represented as a child of a parent menu item contained in said first sub-menu, wherein said first client system displays said first sub-menu and said second sub-menu in an overlapping style on a first display unit associated with said first client system, and said second client system displays said first sub-menu and said second sub-menu in a cascaded style on a second display unit associated with said second client system, wherein said context menu is displayed in a first display area on said first display unit and in a second display area on said second display unit, wherein said first display area is smaller than said second display area, wherein said second sub-menu is displayed upon selection of said parent menu item in each of said first client system and said second client system, wherein said first sub-menu and said second sub-menu are displayed in said cascading style in said first client system in view of said first display area being smaller than said second display area.

12. The non-transitory computer readable medium of claim 11, wherein each of said first client system and said second client system displays a corresponding web page containing said first graphical element, each of said first client system and said second client system displaying said first sub-menu upon a first user action with respect to said first graphical element displayed on the corresponding web page, wherein said selection is performed based on said displaying of said first sub-menu.

13. The non-transitory computer readable medium of claim 11, wherein said first display unit has a smaller display screen compared to said second display unit such that said first display area is a small display area and said second display area is a large display area, wherein said first client system determines that said first sub-menu and said second sub-menu are to be displayed in said overlapping style in view of said first display area having said small display area, wherein said second client system determines that said first sub-menu and said second sub-menu are to be displayed in said cascading style in view of said second display area having said large display area.

14. The non-transitory computer readable medium of claim 11, wherein said context menu is rendered in said first client system by a first application in a small display area such that said first display area is said small display area, wherein said context menu is rendered in said second client system by a second application in a large display area such that said second display area is said large display area.

* * * * *